United States Patent

Hawkins

[11] 4,078,866
[45] Mar. 14, 1978

[54] YOKE HOLDER FOR REPLACEABLE BLADES

[75] Inventor: Roy I. Hawkins, Pierce, Colo.
[73] Assignee: Hawkins Mfg., Inc., Pierce, Colo.
[21] Appl. No.: 721,776
[22] Filed: Sep. 9, 1976
[51] Int. Cl.² ............................................. F16C 11/00
[52] U.S. Cl. ...................................... 403/79; 403/98; 172/724; 172/763
[58] Field of Search ............... 172/726, 732, 733, 739, 172/740, 730, 729, 724, 721, 770, 771, 753, 762, 763, 193, 194; 403/98, 79, 408, 41

[56] References Cited

U.S. PATENT DOCUMENTS

| 507,509 | 10/1893 | Taylor | 172/193 |
|---|---|---|---|
| 879,291 | 2/1908 | Meinen | 403/98 |
| 988,284 | 3/1911 | Perkins | 172/739 |
| 1,141,732 | 6/1915 | Vance | 403/98 |
| 1,147,565 | 7/1915 | Tatum | 172/193 |
| 3,396,671 | 8/1968 | Roseberry | 172/771 X |
| 3,684,032 | 8/1972 | Hawkins | 172/753 X |
| 3,713,497 | 1/1973 | Hawkins | 172/753 |
| 3,752,236 | 8/1973 | Foster | 172/753 X |

FOREIGN PATENT DOCUMENTS

| 155,766 | 8/1956 | Sweden | 172/753 |
|---|---|---|---|

Primary Examiner—Andrew V. Kundrat
Attorney, Agent, or Firm—Wilbur A. E. Mitchell

[57] ABSTRACT

A replaceable blade yoke holder, carried by an adapter clamp, comprising a pair of parallel horizontal wedges, with the wedges adapted to be removably held together by bolt holding means, and with certain of adjacent outer edges of the wedges being adapted for replaceably holding a cultivator blade tool there upon bolt holding securement of the wedge together and with an edge of one of the wedges being reinforced with a carbon steel member secured at a ninety degree angle thereto to resist a bending of that wedge upon such bolt holding means securement of the wedges together.

This invention relates to replaceable blades in the farming industry, and more particularly to the type of a cultivator blade which is drawn through the ground a short distance below the surface of the ground. Such a blade usually has a point, and a cutting edge to cut the ground at a required depth. Use of the blade over a comparatively short period of time results in a dulling of the blade and requires that it be replaced. Therefore, the blade is carried in a replaceable manner by a suitable carrier.

5 Claims, 4 Drawing Figures

YOKE HOLDER FOR REPLACEABLE BLADES

This invention is an improvement of the replaceable blade carrier, by way of a better holding of the replaceable blade between a pair of horizontal wedge-like triangular members which are held together by bolt means. Heretofore, as far as known, in such a construction, such parallel holding wedges lose their strength and bend, and thus the blade becomes loosened as a result of that bending. To overcome that result, applicant has reinforced the lower wedge with a high strength carbon steel or bridge-like member at a right angle to and at the rear edge thereof, which supports the lower wedge and prevents such a bending, and thus prevents a loosening of the blade when held between the wedges by the bolts which secure the two wedges together and hold the replaceable blade between the two wedges.

It is thus the principle object of this invention to provide a novel yoke replaceable blade holder, in the form of a pair of horizontal parallel wedges secured replaceably together by bolt means for holding a replaceable blade between certain of the edges thereof, and reinforcing another of the edges of the lower wedge member by a right angular reinforcing bar, to prevent a bending of the lower wedge upon securement of the two wedges together by the bolt securement means.

Another object of this invention is the provision of a replaceable blade yoke holder comprising a pair of parallel members spacedly held together by bolt holding means, and adapted for replaceable securement of a replaceable blade between certain of their parallel edges, and with one of the edges of one of said members having a right angular reinforcing shoulder secured thereto for resisting bolt securement torque and thus preventing that torque from deforming the shape of said one member having that shoulder, and thus thereby assuring replaceable blade securement between the two members when the bolt securement means is in securement relationship between said two members.

Other and further objects will be apparent to those skilled in the art from the following detailed description of the drawings, in which.

Figure 3:
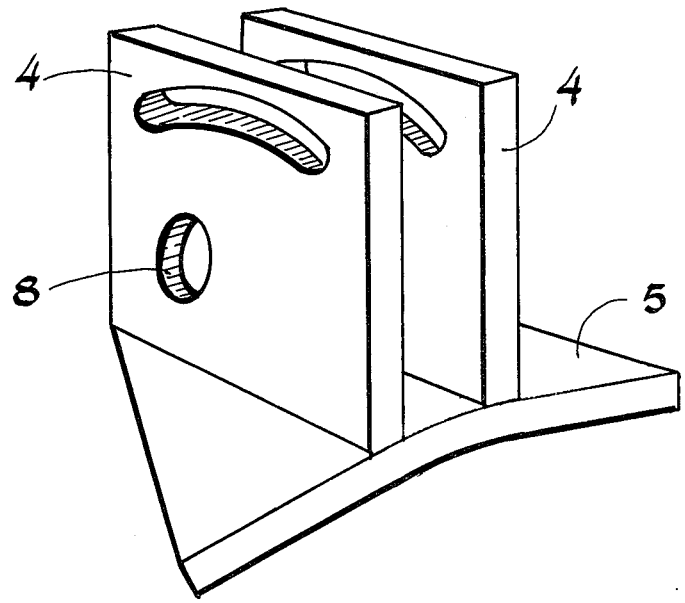
Figure 4:
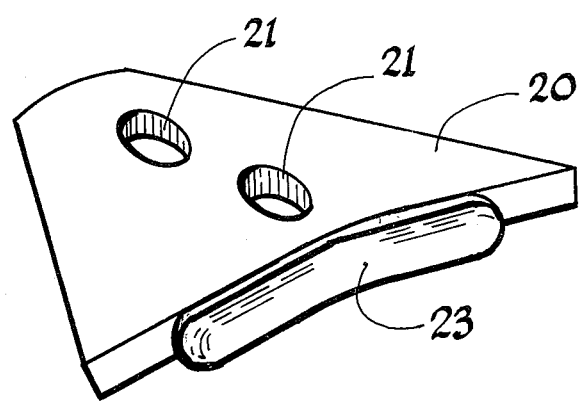

FIG. 3 is an enlarged perspective view of the upper wedge member 5, secured to the adapter 4—4; and FIG. 4 is an enlarged perspective view of the lower wedge member 20.

Figure 1:
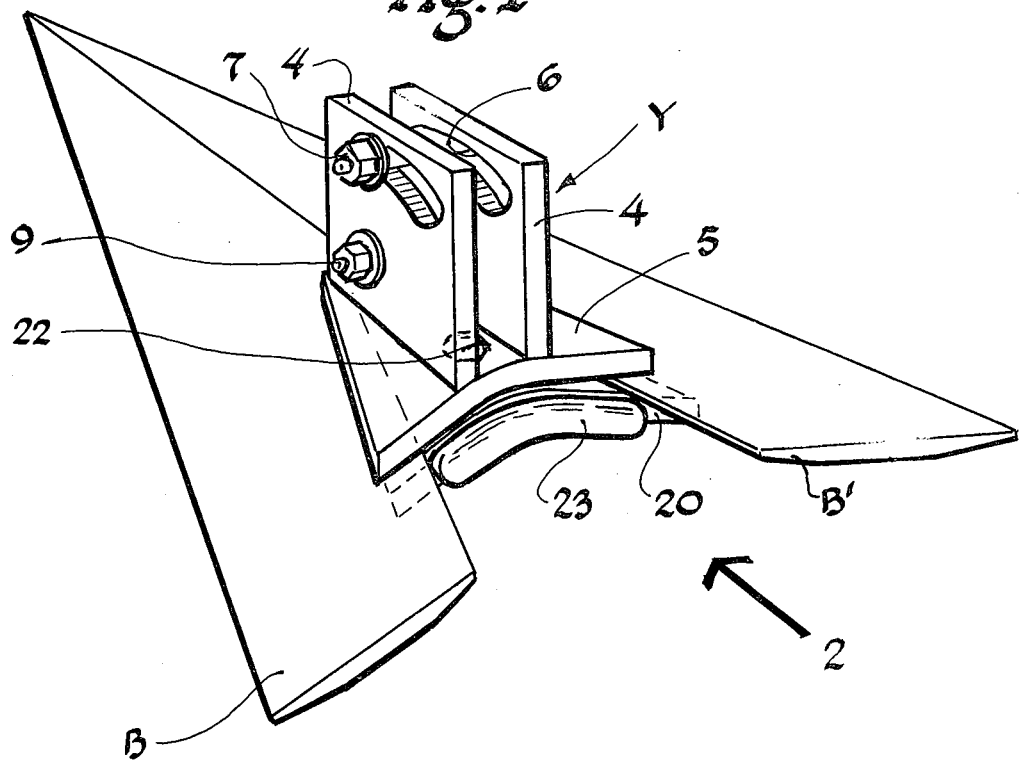
FIG. 1 is a rear perspective view of an adapter clamp having my novel yoke replaceable blade secured thereto and with a replaceable blade held by my yoke holder.

It will be understood that a vertical rigid carrying bar not shown, as on a tractor, is secured between the vertical adapter plates 4—4, FIG. 1. The lower part of plates 4 have aligned openings therein, conventionally, through which bolts 7 and 9 are secured. Thus, the cultivator blade, shown as B, is carried conventionally by means of said bolts and adapter plates 4—4, with the depth of the blade being adjusted by means of the pivot bolt adjustment, conventionally on pivot 9, as accomplished by the adjustment of the bolt 7 through its slotted opening 6 provided in the adapter plates 4, on the pivot 9 of the plates 4—4.

I provide a pair of yoke parallel horizontal plates or wedges to carry the replaceable blade, and designate those wedges as 5 and 20. The wedges are substantially triangular in shape and of the configuration shown, and are substantially in parallel arrangement, being spaced apart sufficiently so that the pointed cultivator blade is inserted with its inner edges held between the front outer spaced parallel adjacent edges of the wedges 5 and 20, as shown in FIG. 1.

The cultivator blade is of half-rhomboid configuration, and also the 2 wedges are similarly half-rhomboid configuration and are spaced and carried parallel one to the other.

Upper wedge 5 is secured transversely to the lower ends of plates 4—4, as by being welded thereto as shown. I provide the lower wedge 20, of similar shape and it is carried parallel in horizontal relationship to the upper wedge but spaced below the upper wedge member 5. Wedge 20 has similarly aligned openings to receive holding bolts 22 therethrough, from the upper wedge 5, and those bolts 22 extend through 5 and carry 5 as shown. Suitable nuts are placed upon the lower screw-threaded portion of the bolts 22 as shown.

While those parallel horizontal wedge members 5 and 20 are made of relatively hard carbon steel, in their use in holding the inner edges of the half-rhomboid spearheaded cultivator member blade, as illustrated in FIG. 1, by the two bolts 22 having their respective nuts fully tightened, and thereby the lower wedge 20 is drawn up against the inner edges of the blade, such torque normally causes an upward bending of the lower wedge member 20 as a result of that holding pressure of those tightened bolts. To prevent such a lower wedge bending, upon such tightened holding of the cultivator blade by said parallel yoke holding wedge members 5 and 20, a bridge-like transverse right angular supporting shoulder of harder carbon steel is provided at the rear edge of the lower wedge member, indicated as 23.

Figure 2:
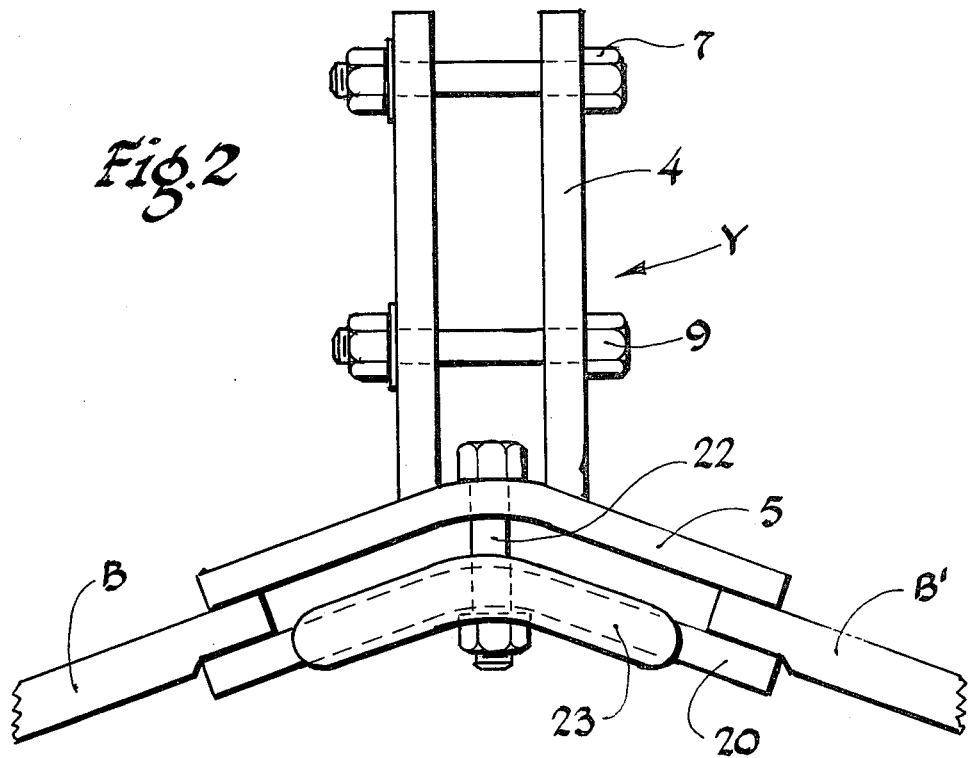
FIG. 2 is an enlarged end view thereof, taken in the direction of the arrow 2 of FIG. 1.

That reinforcing member 23, shown as at that rear edge of the lower wedge, obviously can be of different construction sizes or shapes, for the purpose of preventing a collapsing or bending of the lower wedge, upon the terrific torque holding on that lower wedge, upon a tightening of the nuts of the two holding bolts 22 affecting a drawing of the lower wedge 20 against upper wedge 5, and thereby a holding of the inner edges of the tool B between that wedge 20 and the upper wedge 5, as a result of the drawing together of those two wedges by those bolts, then as shown. It has been found without such reinforcement member that the lower wedge 20 bends and thus the outer edges thereof, as viewed in FIG. 2, slope downwardly and become loosened at the point where the outer portions of the lower wedges press against the blade and thus the blade slips out from between the two holding wedges 5 and 20. By this reinforcing member 23, the lower wedge 20 is held from any substantial bending and the outer edges thereof remain in constant pressure upward contact, as viewed in FIG. 2, upon a full tightening of the holding bolt 22, and thus the cultivator blade is prevented from becoming loosened during cultivation operation during the holding by the bolts 22.

While I have shown only edge traverse holding or right angular bar or shoulder 23 reinforcing the lower wedge 20 from a transverse bending, as a result of torque upward pressure exerted by the holding bolts 22, it is to be understood that there can be various and sundry reinforcing methods used to accomplish such a transverse reinforcement, within the teaching of this invention, such as there can be reinforcing ribs, or a bridge-like beam formed integral with the underside of the wedge 20, or they can be later welded thereto or added thereon as bridge-like reinforcing members, to assure that the lower wedge does not bend during such bolt means holding operation. It is thus of utmost importance that the lower wedge is not ever permitted to be bent during the holding operation brought about by the holding bolts 22 being operated into tightened relationship to cause the two wedge members 5 and 20 to be drawn and held thereby tightly together. It is to be understood that such other method of transverse reinforcing of the lower wedge can be accomplished within the teaching of this invention, though not shown.

In the operation of this invention, it will be seen that here is provided a novel yoke holding member for a replaceable cultivating blade tool in the form of a replaceable blade holding means for a cultivating blade tool. Said yoke holding means comprising a pair of parallel wedges operably held in spaced and parallel relationship to each other by transverse bolt holding means extending therethrough for holding the rear edges of the tool within and between the two parallel wedges upon a tightening of the bolt holding means for compressing the two wedges together. Further, to assure a tight holding of the two wedges together during operation, and to prevent a bending of the lower wedge and thus a loosening of the holding of the blade therebetween and a loss of the blade therefrom, a reinforcing or transverse member means is secured to the lower wedge to reinforce it from such bending. More specifically, in the embodiment hereof, that reinforcing member comprises a right angular member secured to the rear edge of the lower wedge member. However, as explained, said reinforcing member need not be confined to the rear edge thereof, but could, for example, be on the underside thereof, as a reinforcing member rib, or otherwise bridge-like reinforcing member, to insure, upon a tightening of the bolt holding means, that the lower wedge member does not bend as a result of the torque exerted into that lower wedge by the bolt holding means upon operation of the yoke holding member.

It will thus be seen that the lower wedge 20 with its right angular reinforcing member means 23, amounts to a triangular three-sided half-rhomboid tent-like washer means, when considered cross-sectionally vertically, through which the bolt holding means exerts the upward bolt holding pressure to effect a blade holding between 20 and 5, as explained.

Having thus explained in detail the construction and operation of the invention, it is to be understood that many changes and modifications may be made therein within the spirit and teaching and scope thereof, and that it is intended to be limited only by the hereunto appended claims.

What I claim and desire to secure by Letters Patent is:

1. A yoke replaceable blade holder comprising a pair of parallel aligned upper and lower plates with the upper plate adjustably secured to and carried substantially horizontally by an adapter carrying bar, each plate having an aligned opening therein for receiving a bolt holding means therethrough for holding the plates removably together and having an overlapping adjacent pair of edges adapted to receive and replaceably hold a cultivator blade therebetween a removable bolt holding means extending through said plates and operable to hold the plate together and a reinforcing bar means secured to the lower plate to reinforce it against the bolt holding means holding torque causing a bending thereof upon bolt holding operation.

2. A yoke replaceable blade holder combination as defined in preceding claim 1, and defined further by the plates being of carbon steel and the reinforcing bar means being of harder carbon steel than that of the plates.

3. A yoke replaceable blade holder combination as defined in preceding claim 2, and defined further by the reinforcing bar means being secured to the lower plate at a right angle thereto.

4. A yoke replaceable blade holder comprising in combination as defined in preceding claim 3, and defined further by the parallel plates each having three edges and the reinforcing bar means being a bridge-like beam and secured to the lower plate at one edge thereof.

5. A yoke replaceable blade holder comprising, in combination with a vertical rigid adjustable adapter carrying bar, a pair of substantially triangular washers carried adjustably spacedly horizontally parallel one above the other by the upper one thereof being secured to the adapter bar and an operable bolt holding means extending from the upper one to and through the lower one thereof for effecting a carrying and such adjustable holding of the lower one thereof to and against the upper one thereof, with two adjacent parallel side edges of the washers being adapted for receiving and replaceably holding a cultivator blade therebetween upon said bolt holding means operation, and said lower triangular washer having a right angular reinforcing bar means secured thereto for washer strength and being formed cross-sectionally vertically half-rhomboid for washer strength.

* * * * *

UNITED STATES PATENT OFFICE
CERTIFICATE OF CORRECTION

Patent No. 4,078,866                    Dated March 14, 1978

Inventor(s)  Roy I. Hawkins

It is certified that error appears in the above-identified patent and that said Letters Patent are hereby corrected as shown below:

Column 4, line 15, "plate" should read -- plates --.

Signed and Sealed this

Seventeenth Day of October 1978

[SEAL]

Attest:

RUTH C. MASON
*Attesting Officer*

DONALD W. BANNER
*Commissioner of Patents and Trademarks*